United States Patent
Ross et al.

(10) Patent No.: US 9,876,599 B2
(45) Date of Patent: Jan. 23, 2018

(54) SYSTEM(S), METHOD(S), AND APPARATUS FOR ACCURATE DETECTION OF THE END OF STREAM

(75) Inventors: Steven Ross, Bedford, NH (US); Vijay Kumar, Andover, MA (US); Jean Zhou, Nashua, NH (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1144 days.

(21) Appl. No.: 11/958,272

(22) Filed: Dec. 17, 2007

(65) Prior Publication Data

US 2009/0154502 A1  Jun. 18, 2009

(51) Int. Cl.
| H04J 3/24 | (2006.01) |
| H04J 3/06 | (2006.01) |
| H04N 21/43 | (2011.01) |
| H04N 21/434 | (2011.01) |

(52) U.S. Cl.
CPC ............ *H04J 3/247* (2013.01); *H04J 3/0602* (2013.01); *H04N 21/434* (2013.01); *H04N 21/4307* (2013.01)

(58) Field of Classification Search
CPC .... H04J 3/0602; H04J 3/247; H04N 21/4307; H04N 21/434
USPC ......................................... 370/535, 473, 476
See application file for complete search history.

(56) References Cited

U.S. PATENT DOCUMENTS

| 5,050,166 | A | * | 9/1991 | Cantoni et al. ............... 370/473 |
| 5,675,331 | A | * | 10/1997 | Watanabe ............ H03M 7/425 341/67 |
| 6,122,998 | A | * | 9/2000 | Iwashita ................ B23B 13/02 414/14 |
| 6,614,793 | B1 | * | 9/2003 | Richards et al. ........ 370/395.64 |
| 6,668,022 | B1 | * | 12/2003 | Kim ......................... 375/240.27 |
| 2001/0001023 | A1 | * | 5/2001 | Imahashi et al. ............... 386/55 |
| 2001/0001616 | A1 | * | 5/2001 | Rakib et al. .................. 375/259 |
| 2001/0012293 | A1 | * | 8/2001 | Petersen et al. .............. 370/389 |
| 2002/0026645 | A1 | * | 2/2002 | Son et al. ...................... 725/117 |
| 2002/0041595 | A1 | * | 4/2002 | Delvaux ....................... 370/392 |
| 2002/0089972 | A1 | * | 7/2002 | Chang et al. ................. 370/352 |
| 2002/0122430 | A1 | * | 9/2002 | Haberman et al. ........... 370/429 |
| 2003/0126238 | A1 | * | 7/2003 | Kohno et al. ................. 709/220 |
| 2004/0027890 | A1 | * | 2/2004 | Nakanishi et al. ........... 365/202 |
| 2005/0116946 | A1 | * | 6/2005 | Chung ........................... 345/418 |
| 2006/0012709 | A1 | * | 1/2006 | Yamada ................. H04N 5/04 348/515 |
| 2008/0250101 | A1 | * | 10/2008 | Tanaka ................ G11B 27/005 709/203 |

* cited by examiner

*Primary Examiner* — Stephen J Clawson
(74) *Attorney, Agent, or Firm* — McDermott Will & Emery LLP

(57) ABSTRACT

A multimedia presentation system for presenting multimedia data comprising a demultiplexing unit and at least one processing unit. The demultiplexing unit demultiplexes a plurality of streams of data. At least one presentation processing unit provides the plurality of stream of data for presentation according to predetermined timing and detecting an end of any one of the plurality of streams of data.

23 Claims, 5 Drawing Sheets

SYSTEM(S), METHOD(S), AND APPARATUS FOR ACCURATE DETECTION OF THE END OF STREAM

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

DVDs often contain multiplexed MPEG streams in which the individual, synchronized streams end at differing times. It may be common for a particular stream to have a single frame combined with several seconds of audio such that the video is to be presented at the very beginning of the stream presentation and held on the display for the duration of the audio.

It is often necessary for the system to detect when the decoders have completed presentation of the entire stream. Metadata purporting the ending timestamp value can be erroneous or incorrectly correlated with the last value seen by the decoder's presentation unit such that the end of the stream cannot be reliably detected. When the end of stream is incorrectly detected the system will often improperly play the current or subsequent streams.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s) and apparatus for accurately detecting the end of a stream, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
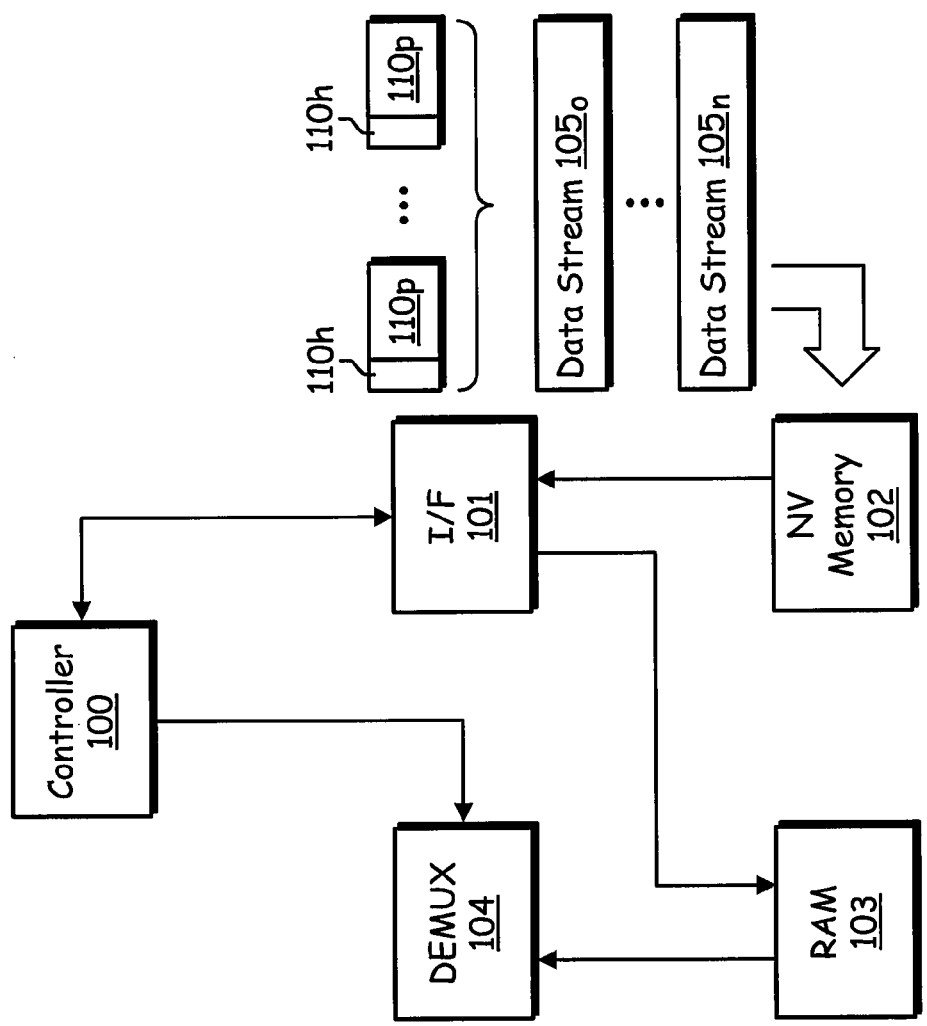
FIG. 1 is a block diagram of an exemplary circuit for presenting data in accordance with an embodiment of the present invention.

Referring now to FIG. 1, there is illustrated a block diagram describing an exemplary system for providing media for presentation. The system comprises a controller 100, an interface 101, a media source 102, RAM 103, and a demultiplexer 104.

The media source 102 may comprise a variety of sources which may provide the media. For example, the media source may be a memory system, such as non-volatile memory. Non-volatile memory comprises memory or a storage medium that is generally suitable for the storage of content when such content is not in use. The Non-volatile memory shall include, but is not limited to, for example, a hard disc, a compact disc, a DVD, flash memory, and magnetic tape devices. Alternatively, the media source 102 may include an input port for receiving the media over a network.

The media source 102 stores a plurality of data streams 105. The data streams 105 can be multiplexed onto the media source 102 using multiplexed packets 110. In certain embodiments of the present invention, the multiplexed packets 110 can include transport packets, such as MPEG transport packets. Alternatively, the multiplexed packets 110 can include MPEG program stream packs.

The data streams 105 contain data that is to be presented simultaneously according to a certain timing. The timing can be indicated at various intervals in each of the data streams 105 with timing stamps. A variety of compression standards may also be used to compress the data in the data streams 105.

The multiplexed packets 110 include a payload 110$p$ and a header 110$h$. A portion of a particular data stream 105 can be carried in the payload 110$p$. The header 110$h$ can include an identifier that identifies the particular data stream that the payload 110$p$ carries. For example, in an MPEG transport stream, the identifier is known as a Packet Identifier (PID).

The controller 100 can cause the circuit to provide the data streams 105 for presentation. The controller 100 causes the circuit to do the foregoing by commanding the interface 101 to retrieve the multiplexed packets 110 from the media source 102 and then write the multiplexed packets 110 to the RAM 103. The demultiplexer 104 receives the multiplexed packets 110 from the RAM 103 and demultiplexes the data streams 105. Additional circuitry can then further process the data streams 105 for presentation.

It is noted that the individual data streams 105 can end at different times. For example, a particular stream may have a single frame combined with several seconds of audio such that the video is to be presented at the very beginning of the stream presentation and held on the display for the duration of the audio. If the end of an individual stream 105 is incorrectly detected, the system will often improperly play the current or subsequent streams.

In certain embodiments of the present invention, once the interface 101 retrieves the multiplexed packets 110 from the media source 102, the controller 100 can examine the multiplexed packets 110 to detect the ending points of each particular data stream 105. The controller 100 then inserts a marker 120 into the multiplexed packets 110 that indicates the end of each of the data stream 105 therein.

The controller 100 can include the marker 120 in a number of ways. In certain embodiments, the controller 100 can include a field in the header of the multiplexed packet 120, for example in the adaptation field of a transport packet header. Alternatively, in other embodiments, the controller 100 can append the marker 120 as an additional packet in the multiplexed packets 110.

Figure 2:
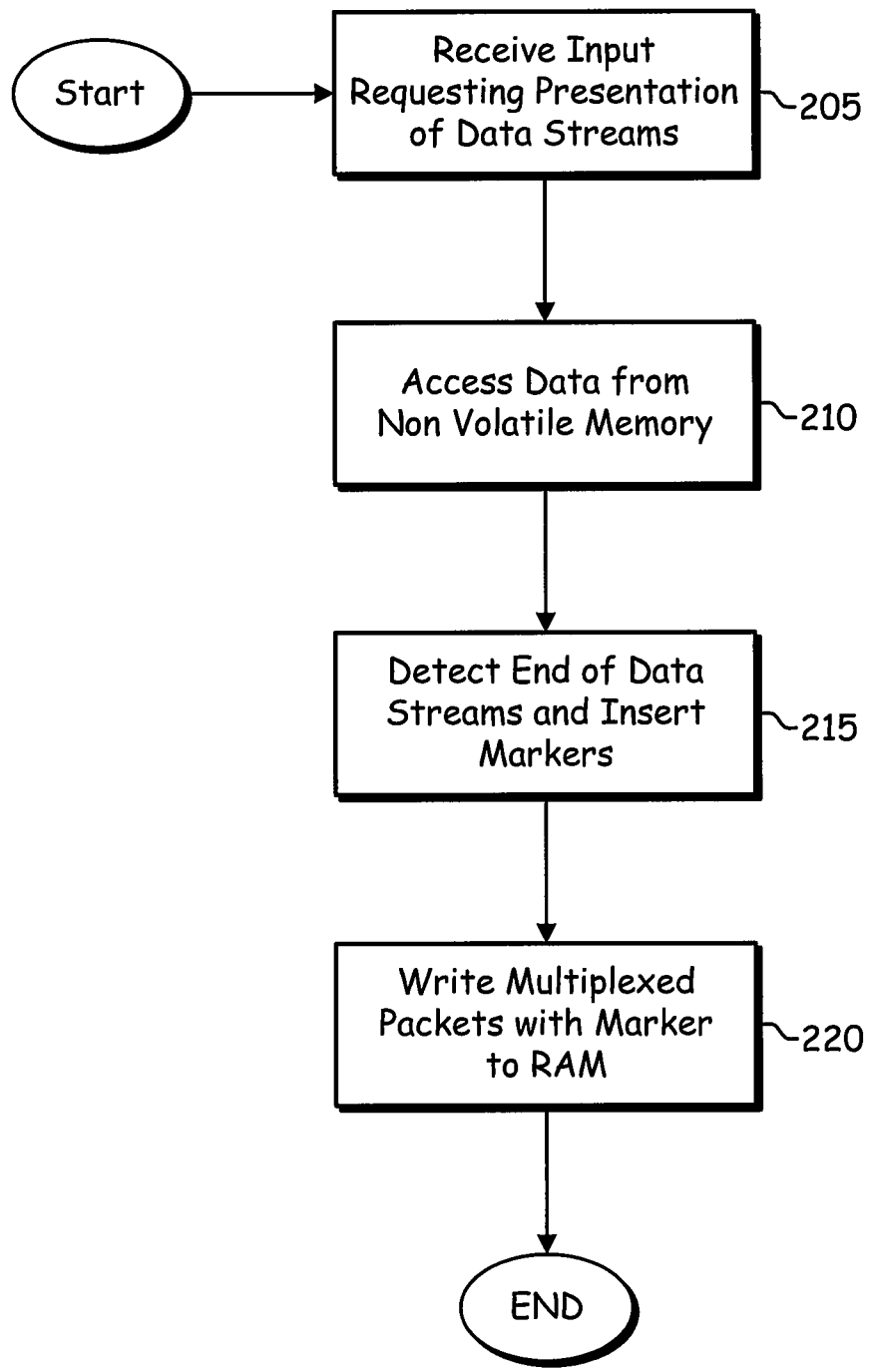
FIG. 2 is a flow diagram for presenting data in accordance with an embodiment of the present invention.

Referring now to FIG. 2, there is illustrated a flow diagram describing the presentation of data in accordance with an embodiment of the present invention. At 205, the controller 100 receives an input requesting presentation of the multiplexed packets 110 carrying the data streams 105. At 210, the controller 100 so commands, and the interface 101 accesses the data from the media source 102. At 215, the controller 100 detects the end of each data stream 105 and inserts an end of data stream marker 120 in the packets 110. At 220, the interface 101 writes the multiplexed packets 110, modified with the end of stream markers 120, to the RAM 103. At 225, the demultiplexer 104 demultiplexes the data streams 105 from the multiplexed packets 110.

Figure 3:
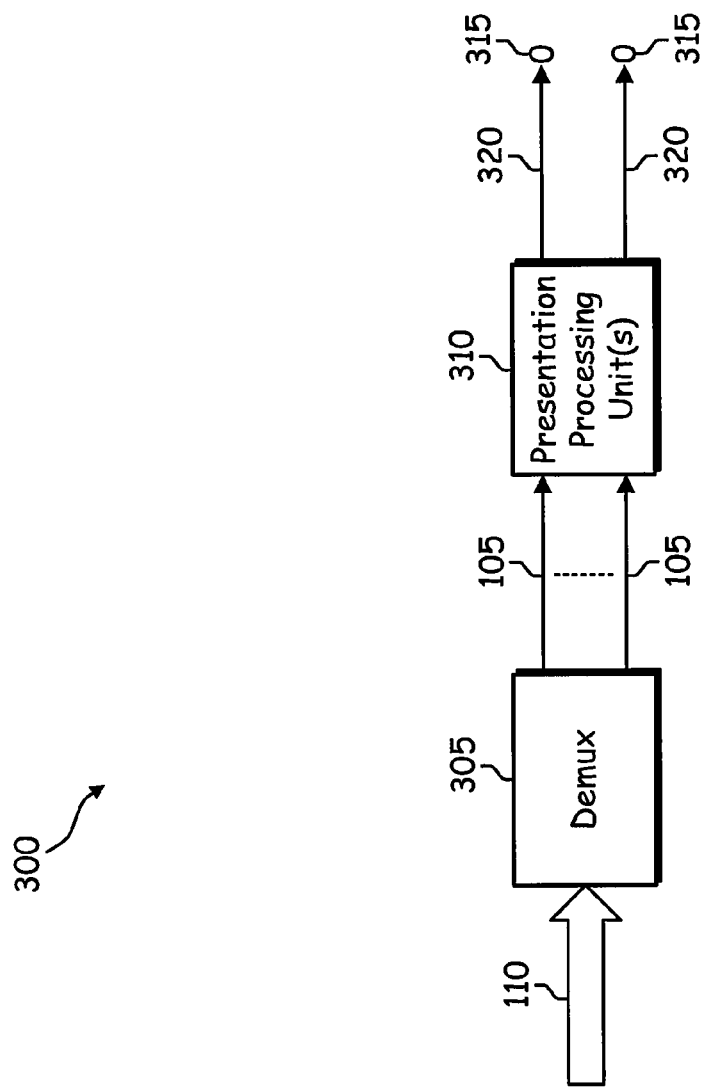
FIG. 3 is a block diagram of another exemplary circuit for presenting data in accordance with an embodiment of the present invention.

Referring now to FIG. 3, there is illustrated a block diagram describing another circuit 300 for presenting data in accordance with an embodiment of the present invention. The circuit 300 demultiplexes and simultaneously outputs the data in each of the different data streams 105 in accordance with the particular timing.

The multimedia presentation system 300 comprises a demultiplexing unit 305, at least one presentation processing unit(s) 310, and a plurality of output ports 315. The demultiplexing unit 305 receives and demultiplexes the multiplexed packets 110, thereby recovering each of the data streams 105.

Each of data streams 105 are associated with a particular one of the output ports 315. The presentation processing unit(s) 310 outputs processed data 320 in each of the data streams 105 according to the timing via the output port 315 that is associated with each data stream 105. In certain embodiments of the present invention, the presentation processing units can decompress the data as needed.

It is also noted that in certain embodiments of the present invention, the processed data 320 can comprise reconstructed data that was compressed using lossy compression. The reconstructed data 320 may not be exactly the same as the original data that was compressed using the lossy compression, but perceptually similar.

Certain embodiments of the present invention may include a presentation processing unit 310 for each of the data streams 105. Alternatively, certain embodiments may include a presentation processing unit 310 for each type of media that is stored in the data streams 105. For example, the presentation processing units 310 can include a video processing unit for the data stream(s) 105 that carry video data, and an audio processing unit for the data stream(s) 105 that carry audio data.

Presentation devices, such, for example, monitors or speakers, can receive the outputs from output ports 315 and simultaneously present the data from the data streams 105 according to the timing.

The presentation processing unit(s) 310 is configured to detect the end of stream indicator 120 in the data streams 105 that the presentation processing unit 310 provides. Upon detecting the end of stream marker 120 in the data streams 105, the detecting presentation processing unit 310 sends a notification to each of the other presentation processing unit(s) 310 if any, and/or controller 100, that the end of stream marker 120 is detected.

Figure 4:
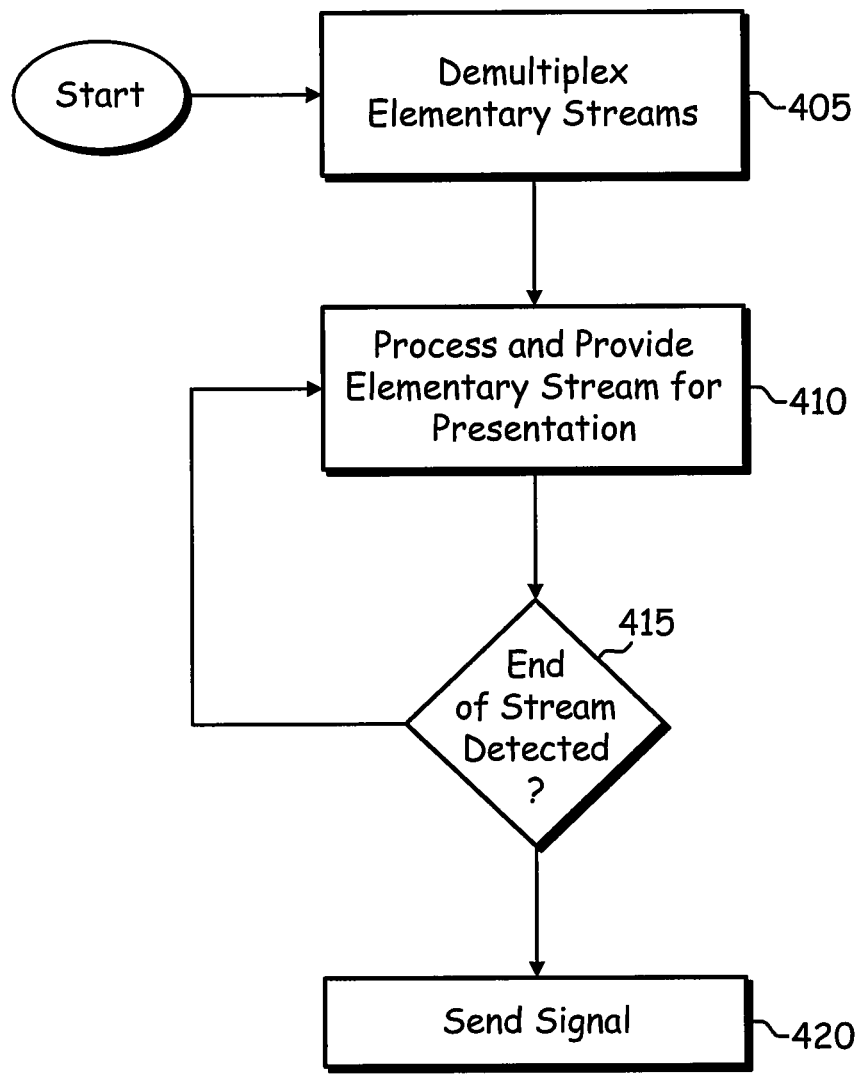
FIG. 4 is another flow diagram for presenting data in accordance with an embodiment of the present invention.

Referring now to FIG. 4, there is illustrated a flow diagram for providing multimedia data for display. At 405, the demultiplexing unit 305 demultiplexes the program streams 105. At 410, the presentation processing unit(s) 310 processes the data streams 105, thereby resulting in processed data 320. At 415, if the end of stream marker 120 is encountered for the data stream 105, the presentation processing unit(s) 310 sends a signal to the other presentation processing unit(s) 310 and/or controller 100.

Figure 5:
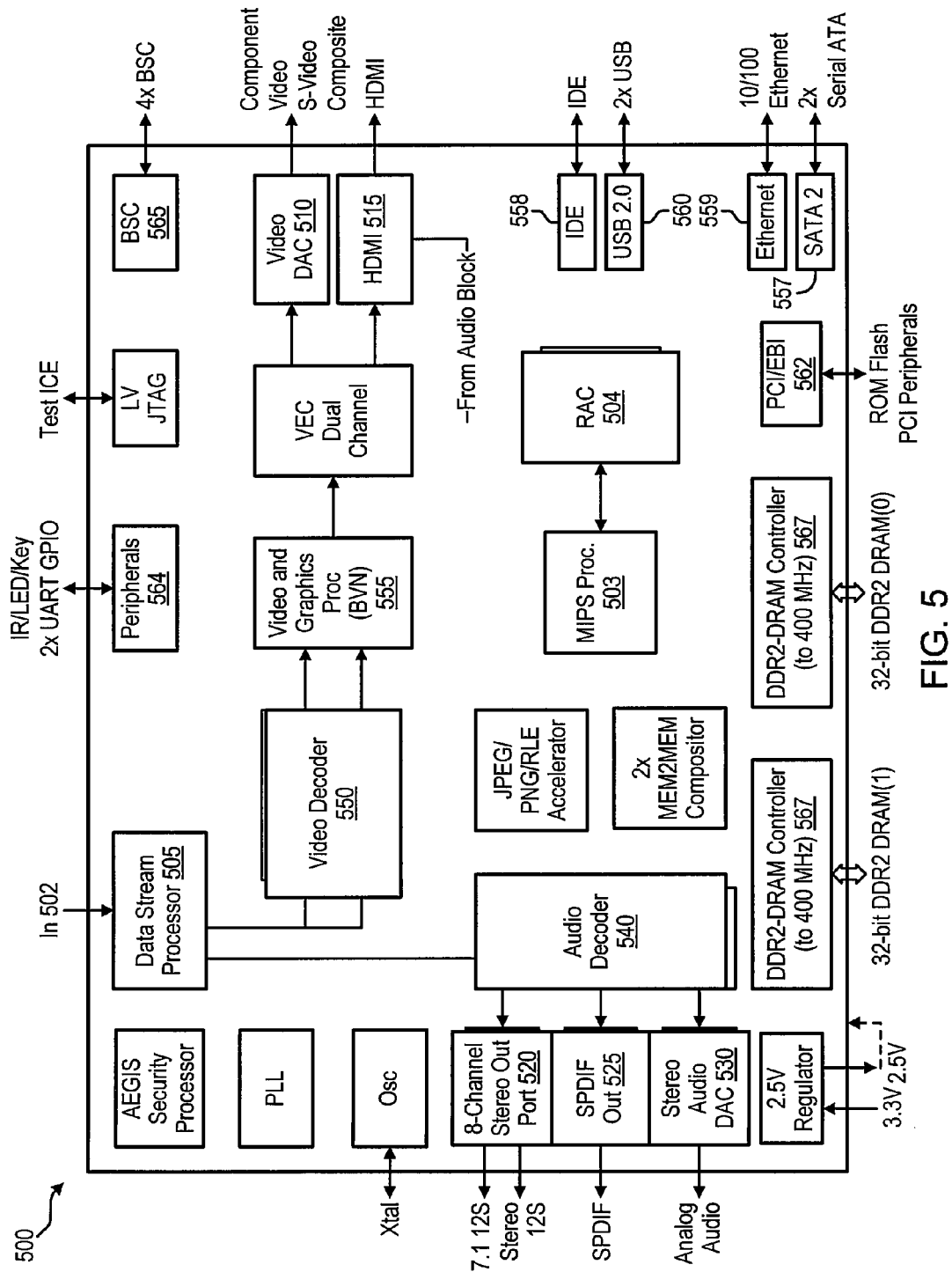
FIG. 5 is an integrated circuit for presenting data in accordance with an embodiment of the present invention.

Referring now to FIG. 5, there is illustrated a block diagram of an exemplary integrated circuit in accordance with an embodiment of the present invention. The integrated circuit 500 can provided a highly integrated silicon platform for High Definition DVD players. It may be also be used in conjunction with a separate encoder.

The integrated circuit 500 is operable to provide at least one video elementary stream and at least one audio elementary stream for presentation on an output device, such as a screen or speaker from a non-volatile memory storing the elementary streams 105. The elementary streams 105 can be multiplexed onto the non-volatile memory using transport packets 110.

The at least one video and at least one audio elementary streams 105 contain data that is to be presented simultaneously according to a certain timing. The timing can be indicated at various intervals in each of the elementary streams 105 with decode and presentation time stamps. MPEG compression standards are used to compress the data in the elementary streams 105.

A MIPS processor 503 can cause the integrated circuit to provide the at least one video elementary stream and at least one audio elementary stream 105 for presentation. The MIPS processor 503 can support HD-DVD and BD graphics, HD-DVD and BD Navigation, interconnectivity, content protection and decryption, and a floating point unit for graphics (font rendering) and JAVA support. The core processor can include a multimedia unit, 32K/16K instruction, 32K data cache, and a 128K read ahead cache (RAC) 504 for performance.

The MIPS processor 503 causes the integrated circuit to do the foregoing by commanding an interface, SATA 2 557 to retrieve the transport stream 110 from the non-volatile memory and then write the transport stream 110 to a RAM.

It is noted that the at least one video elementary stream and at least one audio elementary stream 105 can end at different times. For example, a video elementary stream 105 may have a single frame combined with several seconds of audio such that the video is to be presented at the very beginning of the stream presentation and held on the display for the duration of the audio. If the end of an individual video or audio elementary stream 105 is incorrectly detected, the system will often improperly play the current or subsequent streams.

In certain embodiments of the present invention, once the SATA 2 557 retrieves the transport stream 110 from the media source 102, the MIPS processor 503 can examine the transport packets 110 to detect the ending points of each particular video and/or audio elementary stream 105. The MIPS processor 503 then inserts a marker 120 into the transport packet 110 that includes the end of a elementary stream 105. The marker 120 indicates that the packet includes the end of the elementary stream 105 therein.

The MIPS processor 503 can include the marker 120 in a number of ways. In certain embodiments, the MIPS processor 503 can include a field in the header of the transport packet. Alternatively, in other embodiments, the MIPS processor 503 can append the marker 120 to the portion of the elementary stream in the payload.

The integrated circuit 500 receives transport stream packets 110 at input 502 that carries at least one video elementary stream 105v and a plurality of audio elementary streams 105a. The video data from the selected video elementary stream(s) can be output in Component Video, or S-Video via video digital to analog converter (DAC) 510, and HDMI via HDMI output port 515. The analog data can be output in 7.1 Channel Output format or Stereo I2S format via 8 Channel/Stereo output port 520, SPDIF format from SPDIF output port 525, and analog via Stereo Audio Digital Audio Converter 530.

The integrated circuit 500 can include a data stream processor 505 for receiving the transport stream 110. As noted above, the transport stream 110 comprises a plurality of packets carrying data from particular elementary streams 105 and headers 110h. The headers 110h include packet identifier fields PID identifying the particular elementary stream.

The program stream processor 505 receives a program stream via input 502 and filters at least one selected video and at least one audio elementary streams 105 that are to be presented from the transport stream 110. The data stream processor 505 parses the transport stream packet headers 110h, examining the PIDs, and provides selected audio elementary streams 105a and the at least one video elementary streams 105v to an audio decoder 540 and a video decoder 550, respectively.

Video Decoder

The video decoder 550 decodes video elementary streams 105v and is equipped with codecs to decode video data compressed in accordance with Advanced Video Coding (AVC, also known as H.264, and MPEG-4, Part 10), SMPTE VC-1 Advanced Profile Level 3, SMPTE VC-1 Simple Profile to Medium Level, and SMPTE VC-1 Main Profile to High Level. The video decoder 550 can be capable of simultaneous single high definition and standard definition decoding.

Additionally, in certain embodiments of the preset invention, the video decoder 550 is configured to detect the end of stream marker 120 in the video elementary stream 105v and send a signal indicating the same to the audio decoder 540, and MIPS processor 503.

The video decoder 550 provides decoded and decompressed video to a video and graphics processor 555. In certain embodiments, the video and graphics processor 555 can provide any of the following features:

Hardware support for two content and user interaction-driven 2D graphics planes with full HD resolution—Presentation Graphics Plane
  Foreground (Interactive) Graphics Plane
  Vendor OSD graphics overlay plane (in addition to the two planes described above), overlays all graphics and video planes)
  Alpha-blending capabilities on all planes
  Simultaneous support for HD and SD output of the same content and graphics
  Select between overlay plane only or scaled version of composite output for secondary outputs
  Video Scaler: Horizontal and vertical with programmable zooming (frame by frame); independently configured for each video stream
  Alpha blending capabilities
Three levels of graphics, two video
HD-DVD Clear Rect Function on secondary video plane
  Motion adaptive de-interlacer
  Thomson Film Grain insertion technology (FGT)
  Main Output Compositor with five inputs
Three graphics feeds and two video feeds
  Component outputs can output a reduced resolution version of the full HD signal if the corresponding AACS-defined flag is set by the content provider (DVO and HDMI outputs must remain at full resolution).

Additionally, in certain embodiments of the preset invention, Video and Graphics Processor 555 is configured to detect the end of stream marker in the video elementary stream 105v and send a signal indicating the same to the audio decoder 540, and MIPS processor 503.

A single output image is then sent to the VEC (video encoder) which converts it to the various analog and digital output formats (composite video, S-video, RF video, component video, HDMI, DVI, etc).

Audio Decoder

The audio decoder 540 receives and decodes the audio data from the audio elementary streams 105a and provides the decoded audio data to the 8 Channel/Stereo output port 520, SPDIF output port 525, and Stereo Audio Digital Audio Converter 530.

Additionally, in certain embodiments of the preset invention, audio decoder 540 is configured to detect the end of stream marker 120 in the audio elementary stream 105a and send a signal indicating the same to the video decoder 550, and MIPS processor 503.

The audio decoder 540 can include any of the following features:
  Audio Standards
  LPCM to 7.1 channels
  MPEG audio
  MPEG-1 Layer III (MP3) to stereo
  Dolby Digital (AC3) to 5.1 channels
  Dolby Digital Plus to 7.1 channels
  Dolby TrueHD MLP (Compressed LPCM)—DTS to 5.1 channels DTS—HD to 7.1 channels
  MPEG-4 High-Efficiency AAC to 5.1 channels WMA Pro LPCM
  MLP (Compressed LPCM) aka Dolby TrueHD—AAC-HE (IP-STB)
  Dolby Digital multi-channel Bass Management support, with equivalent support for DTS
  PCM audio mixing and post processing—Primary and Secondary decoded streams with:
  Audio clips input over Host I/F or from stream input
  Individually controlled mixing and fading
  Speaker Management Capabilities; minimum support for "Small," "Large," and "Off" settings
  PCM audio mixing and post-processing
  Mix primary and secondary decoded streams with effects sounds
(PCM)
  Individually controlled mixing and fading
  Re-encode result of mixed primary and secondary programs and PCM effects for S/PDIF or HDMI output:
  Formats: AC-3 5.1, DTS 5.1

The integrated circuit 500 can include a number of system interfaced, including, for example, Dual SATA interfaces 557, Parallel IDE interface 558, 10/100 Base T Ethernet Port 559, Dual USB 2.0 host ports 560, 32-bit PCI v2.2 33-MHz Master/Target interface/EBI Parallel Bus 562, Dual UART interface/GPIO/User interface pins 564, Serial Controller (SC) ports 565, NAND flash support, external FLASH support. The integrated circuit 500 can also include a number of different memory interfaces, such as DDR Interfaces 567, and SDRAM controllers.

In certain embodiments of the present invention, the integrated circuit can consume 7.0 W in full operation (simultaneous HD and SD decoding, dual audio programs, and full graphics package running). The integrated circuit 300 can also include a power down mode that reduces the power consumption from the active state by a minimum of 90% or the level required by phase 2 of the EnergyStar specification for DVD devices (<1 Watt). In the foregoing state, the processor and user interface remain active. The supply voltage for the core may be 1.2V, the DDR interface 367 supply voltage may be 1.8V, and the PCI/EBI/GPIO interface 362 voltage may be 3V. The integrated circuit 300 can also include a voltage regulator that provides 2.5V from a 3.3V input and outputs it on a power pin for use on the integrated circuit 2.5 inputs.

In one embodiment of the present invention can comprise a chip with each of the aforementioned structures integrated thereon, and further comprising a plurality of pins that are electrically connected to the various input and output ports thereby providing access to external structures. The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on VC-1, H.264, and MPEG-2 encoded video data, the invention can be applied to a video data encoded with a wide-variety of standards.

Therefore, it is intended that the present invention not be limited to the particular embodiment disclosed, but that the present invention will include all embodiments falling within the scope of the appended claims.

The invention claimed is:

1. A circuit for presenting data, said circuit comprising:
   interface circuitry configured to receive multiplexed packets from a media source, wherein said multiplexed packets carry a plurality of different individual synchronized streams of audio and video data multiplexed into a single multiplexed data stream;
   controller circuitry configured to:
      examine each of the multiplexed packets and detect an end of each of said plurality of synchronized streams of data in only some of the multiplexed packets forming the multiplexed data stream received by the interface circuitry; and
      modify the multiplexed data stream to be a modified multiplexed data stream by selectively appending markers to each synchronized stream of data within the multiplexed data stream, said markers appended to only indicate those multiplexed packets that include a detected end of a respective synchronized stream of data for each of said plurality of synchronized streams of data within said modified multiplexed data stream;
   demultiplexing circuitry configured to receive the modified multiplexed data stream and demultiplex the modified multiplexed data stream to generate demultiplexed streams of data; and
   presentation processing circuitry comprising a first decoder circuitry configured to decode and output one of the demultiplexed streams of data of a first multimedia type for presentation, and a second decoder circuitry configured to decode and output the demultiplexed streams of data of a second multimedia type for presentation, the first decoder circuitry configured to signal the second decoder circuitry when each of the markers in the demultiplexed streams of data of the first multimedia type are detected.

2. The circuit of claim 1, wherein the interface circuitry writes the modified multiplexed data stream to a Random Access Memory (RAM).

3. The circuit of claim 1, wherein modification of the multiplexed data stream by selectively appending markers further comprises the marker being written by the controller circuitry in a header of a multiplexed packet identified from the multiplexed data stream as including a detected endpoint of a respective synchronized stream of data.

4. The circuit of claim 1, wherein modification of the multiplexed data stream by appending markers further comprises addition of an additional packet to the multiplexed data stream to form the modified multiplexed data stream, said additional packet indicative of an end of only one of the plurality of different synchronized streams of data included in the multiplexed data stream.

5. The circuit of claim 1, wherein one of the demultiplexed synchronized streams of data comprises an audio elementary stream and wherein the presentation processing circuitry comprises:
   audio decoder circuitry configured to decode audio data for presentation, and detect the marker in the audio elementary stream.

6. The circuit of claim 5, wherein the audio decoder circuitry is configured to decode the audio data for presentation by decompressing the audio elementary stream.

7. The circuit of claim 5, wherein the one of the demultiplexed synchronized streams of data comprises a video elementary stream, and wherein the presentation processing circuitry comprises:
   video processor circuitry configured to provide the video elementary stream for presentation, and detect the marker in the video elementary stream.

8. The circuit of claim 7, wherein the presentation processing circuitry further comprises:
   video decoder circuitry configured to decompress the video elementary stream.

9. The circuit of claim 1, wherein the demultiplexed synchronized streams of data comprise a stream of graphics data, and wherein the presentation processing circuitry comprises:
   graphics processor circuitry configured to provide graphics data for presentation, and detect the marker in the stream of graphics data.

10. The circuit of claim 9, wherein the presentation processing circuitry further comprises:

graphics decoder circuitry configured to decompress the stream of graphics data.

11. The circuit of claim 1, wherein the presentation processing circuitry is configured to detect the markers prior to playback of the synchronized streams of data.

12. The circuitry of claim 1, wherein the presentation processing circuitry further comprises an audio processing unit configured to output the demultiplexed synchronized streams of data that carry audio data and a video processing unit to output the demultiplexed synchronized streams of data that carry video data, the audio processing unit to notify the video processing unit when the markers in the synchronized streams of data that carry the audio data are detected and the video processing unit to notify the audio processing unit when the markers in the synchronized streams of data that carry the video data are detected.

13. A method for presenting data, said method comprising:
receiving, with interface circuitry, multiplexed packets from a media source, wherein said multiplexed packets carry a plurality of different individual streams of video and audio data multiplexed into a single multiplexed data stream;
examining, with interface circuitry, each of the multiplexed packets within the multiplexed stream for respective end points of each of said plurality of different individual streams included within the multiplexed data stream;
detecting, with the interface circuitry, respective end points of said plurality of different individual streams within some of the examined multiplexed packets of the multiplexed data stream received by the interface circuitry by identifying an end point of a respective data stream in a respective multiplexed packet;
modifying, with the interface circuitry, the multiplexed data stream by selectively appending markers to at least some of the different individual streams of data within the multiplexed data stream, said markers selectively appended to identify only the respective end points of each of said plurality of different individual streams of data;
receiving, with demultiplexer circuitry, the modified multiplexed data stream;
demultiplexing, with the demultiplexer circuitry, the modified multiplexed data stream to obtain demultiplexed different individual streams of data;
outputting, with presentation circuitry, the demultiplexed different individual streams of data for presentation according to a predetermined timing;
detecting, with the presentation circuitry, the marker for each of said demultiplexed different individual streams of data; and
outputting, with the presentation circuitry, a respective signal for each of the demultiplexed different individual streams of data in response to detection of the respective marker, the respective signal indicative of an end of a respective demultiplexed individual stream.

14. The method of claim 13, further comprising:
writing, with the interface circuitry, the modified multiplexed data stream to a Random Access Memory (RAM); receiving from the RAM and demultiplexing the modified multiplexed data stream, with demultiplexer circuitry, to generate a plurality of demultiplexed streams of data; and decoding and outputting, with decoder circuitry, each of the demultiplexed streams of data for presentation based on the respective markers.

15. The method of claim 13, wherein modifying the multiplexed data stream by appending further comprises writing the marker in a packet header of a respective multiplexed packet included in the multiplexed data stream in which a detected end of a respective synchronized stream of data is included.

16. The method of claim 13, wherein modifying the multiplexed data stream by appending markers further comprises adding an additional packet to the multiplexed data stream to form the modified multiplexed data stream, said additional packet indicating an end of only one of the plurality of different individual streams of data included in the multiplexed data stream.

17. The method of claim 13, wherein outputting the demultiplexed different individual streams of data further comprises:
decompressing an audio elementary stream included among the demultiplexed different individual streams of data.

18. The method of claim 13, wherein outputting the demultiplexed different individual streams of data further comprises:
decompressing a video elementary stream included among the demultiplexed different individual streams of data.

19. The method of claim 13, wherein outputting the demultiplexed different individual streams of data further comprises:
decompressing a graphics stream included among the demultiplexed different individual streams of data.

20. The method of claim 13, further comprising detecting the end points prior to playback of the different individual streams of data.

21. A device comprising:
a memory; and
at least one processor circuit configured to:
receive multiplexed packets from a media source, wherein said multiplexed packets carry a plurality of different individual synchronized streams of audio and video data multiplexed into a single multiplexed data stream;
examine each of the multiplexed packets and detect an end of each of said plurality of synchronized streams of data in only some of the multiplexed packets forming the multiplexed data stream;
modify the multiplexed data stream to be a modified multiplexed data stream by selectively appending markers to each synchronized stream of data within the multiplexed data stream, said markers appended to only indicate those multiplexed packets that include a detected end of a respective synchronized stream of data for each of said plurality of synchronized streams of data within said modified multiplexed data stream;
demultiplex the modified multiplexed synchronized streams of data to generate demultiplexed synchronized streams of data;
output, by an audio processing unit, the demultiplexed synchronized streams of data that carry audio data, and output, by a video processing unit, the demultiplexed synchronized streams of data that carry video data;
notify, by the audio processing unit, the video processing unit when the markers in the synchronized streams of data that carry the audio data are detected; and
notify, by the video processing unit, the audio processing unit when the markers in the synchronized streams of data that carry the video data are detected.

22. The device of claim 21, wherein the demultiplexed synchronized streams of data comprise a stream of graphics data, and the at least one processor circuit is further configured to:
provide graphics data for presentation, and detect the marker in the stream of graphics data.

23. The device of claim 22, wherein the at least one processor circuit is further configured to decompress the stream of graphics data.

\* \* \* \* \*